United States Patent [19]

Solo

[11] Patent Number: 4,562,342
[45] Date of Patent: Dec. 31, 1985

[54] CREDIT CARD PROVIDED WITH CODED SECURITY MEANS

[76] Inventor: Alan J. Solo, 1835 Burnett St., Brooklyn, N.Y. 11229

[21] Appl. No.: 532,362

[22] Filed: Sep. 15, 1983

[51] Int. Cl.⁴ .............................................. G06K 5/00
[52] U.S. Cl. ................... 235/380; 235/448; 235/490; 235/435
[58] Field of Search ............... 235/380, 382, 435, 448, 235/453, 490

[56] References Cited

U.S. PATENT DOCUMENTS

| | | | |
|---|---|---|---|
| 2,967,916 | 1/1961 | Williams | 235/448 X |
| 3,632,991 | 1/1972 | Brinning | 235/435 |
| 3,868,057 | 2/1975 | Chavez | 235/380 |
| 4,476,468 | 10/1984 | Goldman | 235/380 X |

*Primary Examiner*—David L. Trafton
*Attorney, Agent, or Firm*—Goodman & Teitelbaum

[57] ABSTRACT

A credit card including a credit card body bearing the usual information representing the type of card, as well as raised encoded symbols on the card for identifying the card owner, the card having a plurality of foldable tabs with each of the tabs being provided with a different code associated therewith. Folding of selective ones of the tabs, by the card user, provides an additional encoded identification for determining the authenticity of the individual when presenting the card to a vendor.

20 Claims, 5 Drawing Figures

CREDIT CARD PROVIDED WITH CODED SECURITY MEANS

BACKGROUND OF THE INVENTION

This invention relates to credit cards, and more particularly to credit cards having an additional code to verify the authenticity of the user of the card.

The use of credit cards has become commonplace among purchasers. Banks or credit companies issuing the cards generally provide on each card a specific identification number assigned to the particular card owner. The cards usually also include the name of the card owner, and other information such as the expiration date, the day of joining the credit plan, etc.

When presented with a credit card, a vendor initially verifies that the credit card number is rightfully assigned to the name on the card and also checks on the limit of credit of that particular card. This checking can be done manually by means of comparing same against a list, or by telephoning a control checking agency and reading the credit card I.D. number to an operator who checks the number at the central agency. Automatic verification equipment is also available for automatically reading the credit card I.D. number, and through telephone lines transmitting the number, whereas computerized check is made of the credit card I.D. number.

Upon receiving authorization to proceed with the sale, the vendor then inserts the card into an imprinting machine where the numbers on the credit card are imprinted onto a sales slip. The credit card user will then sign the sales slip, and the signature is checked with the user's or owner's signature on the back of the credit card. The user is given one copy of the sales slip while the other copies are retained by the vendor for his records and for transferring to the credit card company for payment thereof.

Since numerous copies of the sales slip are required, the sales slip is usually a multi-part form having carbon paper between the various parts. The credit card I.D. number and the user's name are generally formed of raised letters, and the imprinting machine causes the information to be imprinted onto the multi-part sales slip. When the parts of the sales slip are then separated, the carbon paper contains an imprint of the credit card user's name and number. In many cases, it will also contain a copy of the signature of the credit card user.

Although the carbon paper is intended to be discarded, it has been found that some people obtain the discarded carbon paper and wrongfully utulize the information to imprint counterfeit credit cards. By transferring the card number and the name of the credit card owner, and by knowing the user's signature, an unauthorized person can present a counterfeit credit card, and since the number is properly associated with the corresponding name, when a vendor checks the card, it will check out properly without detection.

In addition to gaining the credit card information from the discarded carbon paper, unauthorized individuals can also gain this information from other sources. For example, lending a credit card will provide other individuals with this information. Vendors can also gain this information directly from the sales slips. Likewise, waiters, repairmen, or anyone else having custody of or access to the credit card will be able to make an imprint of the card and obtain all of the information in order to fabricate a counterfeit card.

Accordingly, there is a need for providing an additional level of security for credit cards in order to be sure that the user or the individual presenting the credit card is actually authorized to do so either by being the owner himself, or through authorization from the owner.

SUMMARY OF THE INVENTION

It is accordingly an object of the present invention to provide a credit card which avoids the aforementioned problems of the prior art credit cards.

Another object of the present invention is to provide a credit card with an additional level of security, in addition to the standard credit card identification number.

A further object of the present invention is to provide a credit card which can be used to verify the authenticity of the card user, not just the card owner.

Still another object of the present invention is to provide a credit card which can be used to detect whether or not the individual presenting the card is or is not authorized to do so by the owner.

A further object of the present invention is to provide a credit card which will prevent the use of counterfeit credit cards.

Another object of the present invention is to provide a credit card verifier which can be used to read encoded information described with the credit card and verify that the individual presenting the card is authorized to do so.

Briefly, in accordance with the present invention, there is provided a credit card having a card body bearing the usual information identifying the type of credit card. The card also includes the usual raised encoded symbols which identifies the card owner. A plurality of foldable tabs are provided on the card body. Each tab has a different symbol on it, whereby the folding of selected ones of the tabs by the card user provides an encoded identification which can be checked to ensure the authenticity of the card user.

In an embodiment of the present invention, the four corners of the card are hinged and can be bent at right angles to the card. Each of the corners has an identifying symbol, such as a number, letter or color. The particular selected ones of the corners that are folded down in a particular sequence provides the additional level of security. Checking the corners that are folded verifies the authenticity of the user of the card.

The present invention also contemplates a credit card verifier having a housing provided with a receiving chamber in which the credit card can be inserted. Slots are positioned about the receiving chamber for receiving the selected bent tabs on the credit card. A decoder in the verifier determines the particular ones of the tabs which are bent to thereby decode the identification information provided by the selection of these tabs. A suitable reading mechanism for reading the raised symbols on the card identifies the card owner. The raised symbols, as well as the decoded information from the folded tabs, are checked to determine the authenticity of the card user.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

In the various figures of the drawings, like reference characters designate like parts.

DESCRIPTION OF THE PREFERRED EMBODIMENT

Figure 1:
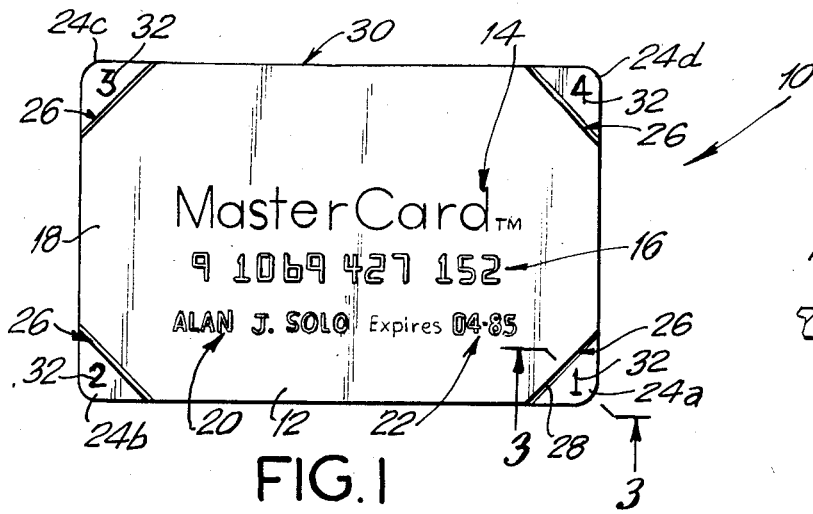
FIG. 1 is a front view of a credit card in accordance with the present invention.
Figure 3:
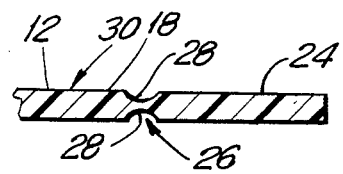
FIG. 3 is a cross sectional view taken along line 3—3 of FIG. 1, showing the hinged relationship of the tab to the credit card body.
Figure 2:
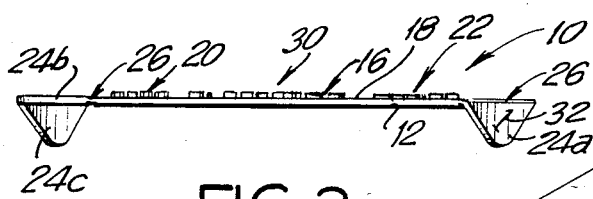
FIG. 2 is a side view of the credit card, showing the first and third tabs bent downward at right angles to the credit card body.

Referring now to FIGS. 1-3, there is shown a credit card 10 having a substantially rectangular credit card body 12, generally formed of plastic material. On the credit card body 12 there is provided information 14 which identifies the particular type of credit card. This information 14 may include the name of the card company or the name of the particular bank issuing the card, as well as particular colors and color scheme arrangements which uniquely identifies the card as a particular type of credit card. This information 14 is normally printed directly on the card.

In addition to the imprinted information 14, there is also provided specific information relating to the particular card owner. Normally, this specific information includes a particular credit card identification number 16 raised above the front surface 18 of the credit card body. The specific information generally also includes the name 20 of the owner of the card, as well as an expiration date 22. Other specific information could also be included, with all the specific information raised above the front surface 18 of the card.

On the back of the card there is usually provided room for verifying signature of the card owner, as well as other information printed by the credit card company relating to loss of the credit card company relating to loss of the card, responsibilities of the credit card company, etc.

With typical credit cards, when the user of the card presents the card for purchasing, the vendor will place the card in a verifier. The verifier will transmit the specific information of the raised number 16 and the name 20 to a central verifying agency. Verification is usually made by means of a telephone hook-up connection. The central agency checks the number 16 against the name 20 to verify that the number belongs to the individual whose name is imprinted on the credit card. They also check the credit available at that time.

By means of this verification, it is not possible for unauthorized individuals to provide counterfeit credit cards having arbitrary numbers and any corresponding name. Upon verification of a counterfeit card, the verifying agency will recognize that the number and name do not correspond and will notify the vendor of the fraud. However, if the unauthorized individual has a number and the corresponding correct name, the verifying agency will not be able to detect the fraud.

Accordingly, an unauthorized individual must only obtain the name of a credit card owner and his correspondingly assigned number. This information can be obtained by means of the carbon paper on any sales slip, obtaining temporary custody of the credit card, or through wrongful acts of a vendor, waiter or any other individual coming in contact with the credit card.

The credit card 10, shown in FIGS. 1 and 2 however, includes a further encoding providing an additional level of security. Specifically, the corners are each separated from the main portion 30 of the credit card by means of a hinge 26 to provide corner tabs 24. As shown in FIG. 3, the particular hinge 26 can be formed by means of a reduced thickness portion 28 on the front and back surface of the card to separate the main body portion 30 from the corner tabs 24. It is understood that other types of hinge arrangements can also be provided.

By means of the hinged arrangement, the corner tabs 24 can be bent in a downward direction, substantially perpendicular to the card body portion 30. The card itself is made of plastic or other similar rigid material, whereby once the corner tabs 24 have been bent downwardly, they will remain substantially perpendicular until such time as they are returned back to their original coplanar position. Each of the corner tabs 24 has a particular unique symbol on it, which is different from the symbols on the other corner tabs. For example, a separate color can be provided on each of the four corners. Alternatively, alpha numeric designations such as the designation 32 can be provided on each of the four corners. Other distinguishing identifying symbols such as letters can also be included. The particular symbols included should preferably be coplanar with the front surface of the card so as not to be raised above the front surface of the card.

Furthermore, the coded information on each of the corner tabs 24 could be provided by altering the length, size or configuration of each tab, which can be used with or without the above mentioned identifying symbols on each tab. Alternatively, the coded information on each of the tabs 24 could be provided thereon so that it is invisible to the human eye. This unseen coded information, by way of example, could be implanted electrical contacts or printed circuits, or could be electronically readable inks or colors provided with a metallic content. This unseen coded information would be read by a scanning device in the verifier as set forth below. Accordingly, other such unseen information can also be provided in this manner. It is noted, that the above mentioned identifying symbols, such as the numbers, letters and colors, can be provided on the tabs 24 as an alias to disguise the actual unseen coded information which is actually being used by the card owner.

A protocol is then established by the card company whereby one particular corner will always represent the first corner and the others will continue in clockwise or counterclockwise direction in a predetermined format. For example, the corner tab designated as 24a can be utilized as the first corner, with the subsequent corner tabs 24b, 24c and 24d representing a proper sequence.

Only the card owner will know in which direction his card is to be read for a proper code sequence. Thereby, this arbitrarily assignment of clockwise or counterclockwise codes to the card owners would help confuse a potential thief. Furthermore, the reading of the card in opposite directions provides additional different code possibilities and thus increases the number of combination codes for each card.

In the present situation, the numbers assigned to the four corners are the numbers 1-2-3-4. In the example shown in FIG. 2, the numbers 1 and 3 have been selected. These numbers are produced by bending downward of the opposing corner tabs 24a and 24c.

By means of the use of the four numbers, as shown, each card owner could be assigned a particular combination of the numbers in a particular sequence. For example, only one of the numbers 1, 2, 3 or 4 could be assigned to the owner. Alternately, the combination of two numbers 1-2, 1-3,or 1-4 could be assigned. Similarly, the combination of the other two numbers 2-3, 2-4, or 3-4 could be used. Three numbers could also be assigned such as 1-2-3, 1-2-4, 1-3-4, or 2-3-4. Likewise, all four numbers 1-2-3-4 could also be assigned. Thus, there are fifteen combinations for each card. Therefore, by changing the numbers for different cards, or using different letters, colors, etc., the encoding possibilities of the present invention are unlimited for use by the card company to increase the level of security.

Accordingly, when the owner is given the card, he is also notified which particular one of the fifteen listed combination codes has been assigned to him. He will remember this combination code and will not transmit the information to anyone else. When the owner presents the card to a vendor, he bends down the corner tabs corresponding to his particular assigned code. The vendor places the card in a suitable verifier. The verifier will check the corner tabs which are bent down and will also check the information imprinted in raised letters on the card. It will then transmit both the raised information, as well as the encoded information of the bent corner tabs to the verifying agency. The agency will then check not only the raised imprinted information, but will cross check this information against the encoded information from the bent corner tabs. When the encoded information provided on the bent corner tabs corresponds to the number assigned to the particular owner of the card, it will indicate to the vendor that the card can be accepted.

Should an unauthorized individual present a counterfeit card, although the card number will correspond to the owner's name imprinted on the card, the unauthorized individual will not know which one of the many combinations of bent corner tabs is the one assigned to the owner. If he bends down the wrong corner tabs, and then presents the card to the vendor, when the vendor inserts the card into the verifier, it will give an indication that the user is not authorized to use this particular card. The vendor will then know that the card is a counterfeit or a stolen card.

For convenience, the card owner can be assigned numbers or letters that might be particularly relevant to him in order to facilitate remembering his code. For example, the particular sequence could provide part of the owner's social security number, his birth date, or other information that he would not tend to forget.

It is noted, that more than one number, letter or color code sequence can be given to each card owner to further reduce the opportunities for fraud. For example, a first purchase in a given day would require the card owner to use two tabs for a proper code sequence. Accordingly, a second purchase made on the same given day would require only one tab for a proper code sequence. A third purchase on the given day, would require the card owner to use the first code sequence of two tabs again. This procedure can be repeated for making purchases on the same day, and would curtail wild spending sprees by thieves or unauthorized persons who illegally obtain the card owner's card after learning the first code sequence.

Figure 4:
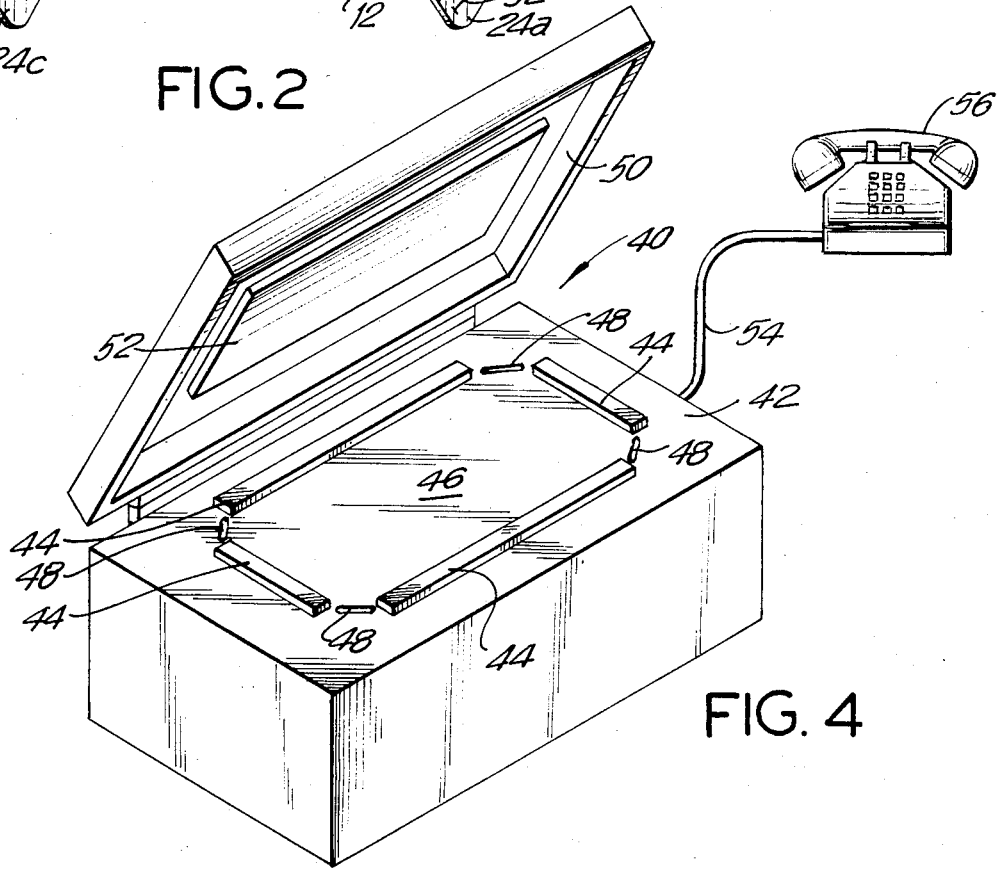
FIG. 4 is a perspective view showing a credit card verifier for use with the credit card of the present invention.

Referring now to FIG. 4, there is shown a verifier 40 which includes a housing 42 having four raised side guide rails 44 for defining a chamber 46 in which the credit card is inserted. At the four corners, there are slots 48. When a credit card is inserted into the chamber 46, it positions itself between the four guide rails 44. Whichever corner tabs have been bent downward will fit into the slots 48. A cover portion 50, including a suitable reading mechanism 52, is then lowered onto the credit card. The reading mechanism 52 will read the raised portions of the credit card including the card number, the name, and the other raised information. Contained within the housing 42, there can be provided the necessary decoding information for reading and decoding the particular information or code presented by the bent corner tabs. Such decoding information could be optical detectors which can detect the presence of a bent corner tab and read same. Electric contacts could also be utilized, which will separate upon insertion of a bent corner tab.

Other types of detectors and readers could be utilized, as is well known in the art. For example, an electronic measuring device can be used in the verifier to measure the differences in the length, size or configuration of each tab, reading either in a clockwise or counterclockwise direction. Furthermore, electronic devices could be used to read the implanted electronic contacts or printed circuits in each of the tabs, as well as the electronically readable inks or colors provided on each of the tabs, the reading sequence being either in the clockwise or counterclockwise direction.

Verifiers of the aforementioned type for checking raised indicia on credit cards are well known in the art. The use of the slots to check the bent corner tabs can be added to existing verifiers. Once the information from the credit cards has been read by the verifier, the information is transmitted along a cable 54 to a suitable telephone apparatus 56 for transmitting to the verifying agency where verification of the information on the credit card is made. Such transmission of the information is well known in the art.

Figure 5:
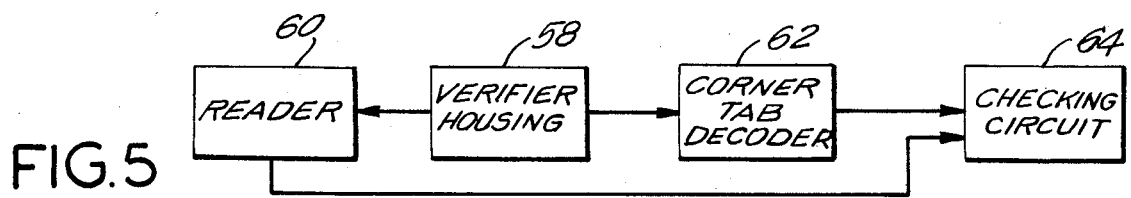
FIG. 5 is a schematic block diagram of the credit card verifier.

As shown in FIG. 5, a verifier housing 58 will be utilized for receiving the credit card. The information from the reader 60 reading the raised information on the credit card, as well as the information from the decoder 62 concerning the bent down corner tabs, are both sent to a checking circuit 64. The checking circuit 64 can either be a local check, or can be sent through the telephone line as heretofore shown in FIG. 4.

It should be appreciated, that the vendor at no time writes down the additional encoded information provided by the bent corner tabs of the present invention. This information is read only by the verifier without ever being written down. Once verification is made, the credit card is then placed in the normal imprinting mechanism. The bent corner tabs will pop up and become straight with the card body, as the imprinting mechanism will only imprint the raised indicia. Accordingly, even if a carbon copy of the raised indicia is picked up by an unauthorized individual, he will still not know the extra information required concerning the bent corner tab data provided by the present invention.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A credit card comprising:
   a card body bearing information representing a type of credit card, and raised encoded symbols on said card identifying said card's owner; and
   a plurality of foldable tabs on said card, each of said tabs having a different code means associated therewith to provide an encoded identification for checking authenticity of a user of said card when selected ones of said tabs are folded by said card user.

2. A credit card as in claim 1, wherein said tabs are hinged corners provided on said card body.

3. A credit card as in claim 2, wherein a reduced thickness portion is provided at a boundary of said hinged corners to define hinges for said tabs.

4. A credit card as in claim 2, including means for folding said tabs in a direction perpendicular to said card body.

5. A credit card as in claim 4, wherein said tabs are fabricated from a rigid material so that said tabs remain folded in said perpendicular direction until unfolded.

6. A credit card as in claim 1, wherein said code means of said tabs include alpha numeric indicia.

7. A credit card as in claim 1, wherein said code means of said tabs include different colors.

8. A credit card as in claim 1, wherein said code means are provided onto said tabs without being raised above an outer surface of said tabs.

9. A credit card as in claim 1, wherein said code means of said tabs are invisible to a human eye.

10. A credit card as in claim 1, wherein said tabs are integrally connected with said card body.

11. A credit card as in claim 1, wherein a sequence of said folded tabs provides said encoded identification.

12. A credit card as in claim 1, wherein length, size and configuration of said folded tabs provides said encoded identification.

13. A credit card verifier comprising:
    a housing;
    a receiving chamber on said housing for receiving a credit card therein;
    slots positioned about said chamber for receiving foldable tabs provided on the credit card when selectively bent at right angles to remaining credit card body by a card user;
    decoding means for determining particular ones of the tabs which are bent to thereby obtain decoded identification information provided by a selection of the tabs;
    reading means for reading raised symbols provided on the card for identifying card owner; and
    checking means for checking both the raised symbols and the decoded information to determine authenticity of the card user.

14. A credit card verifier as in claim 13, wherein said decoding means determines sequence of the tabs which are bent.

15. A credit card verifier as in claim 13, wherein said slots are provided at each corner of said receiving chamber.

16. A credit card verifier as in claim 15, wherein said receiving chamber is substantially rectangular, and wherein said slots are angled across each corner of said chamber.

17. A credit verifier as in claim 13, wherein said checking means is coupled to a telephone for remote checking of the authenticity of the card user.

18. A credit verifier as in claim 13, wherein said decoding means reads code information on the selected tabs which is invisible to a human eye.

19. A credit verifier as in claim 18, wherein said decoding means reads code information of an unseen type including implanted electrical contents and printed circuits, and electronically readable inks and colors.

20. A credit verifier as in claim 13, wherein said decoding means reads length, size and configuration of the selected tabs to obtain the decoded identification information.

* * * * *